US012774199B2

(12) United States Patent
Dienner

(10) Patent No.: US 12,774,199 B2
(45) Date of Patent: Oct. 27, 2026

(54) WALLBOARD JACK

(71) Applicant: Advanced Interiors, Inc., Brownstown, PA (US)

(72) Inventor: Lee Dienner, Ephrata, PA (US)

(73) Assignee: Advanced Interiors, Inc., Brownstown, PA (US)

( * ) Notice: Subject to any disclaimer, the term of this patent is extended or adjusted under 35 U.S.C. 154(b) by 460 days.

(21) Appl. No.: 18/126,062

(22) Filed: Mar. 24, 2023

(65) Prior Publication Data

US 2024/0317551 A1 Sep. 26, 2024

(51) Int. Cl.
*B66F 3/24* (2006.01)
*B66F 3/25* (2006.01)
*E04F 21/18* (2006.01)

(52) U.S. Cl.
CPC ................ *B66F 3/245* (2013.01); *B66F 3/25* (2013.01); *E04F 21/1811* (2013.01)

(58) Field of Classification Search
CPC ....... B23B 47/28; B23B 47/287; B25B 11/00; B25B 11/02; E04F 21/1811; E04F 21/1805; E04F 21/1822
USPC ......................................... 254/120, 129, 131
See application file for complete search history.

(56) References Cited

U.S. PATENT DOCUMENTS 5,640,826 A * 6/1997 Hurilla, Jr. .......... E04F 21/1805 52/749.14
6,857,836 B2 * 2/2005 Keller ..................... B62B 3/022 414/743
2001/0029715 A1 * 10/2001 Bradley .................. E04F 21/18 52/459
2004/0182019 A1 * 9/2004 Flynn .................. E04F 21/1805 52/127.2

* cited by examiner

*Primary Examiner* — Tyrone V Hall, Jr.
(74) *Attorney, Agent, or Firm* — Barley Snyder

(57) ABSTRACT

A wallboard jack assembly is provided and includes a pair of extension beams, a cross beam, a pair of support beams, a locking mechanism, a grab bar, a back plate, and a top plate. The pair of extension beams includes a plurality of adjustment notches. The cross beam is positioned between the pair of extension beams. The pair of support beams includes an extension passageway extending a length of each support beam of the pair of support beams. The locking mechanism extends through each support beam of the pair of support beams. The grab bar is positioned between each support beam of the pair of support beams. The back plate includes a plurality of slots. The top plate includes a bellow located in a central region of the top plate.

16 Claims, 14 Drawing Sheets

WALLBOARD JACK

FIELD OF THE INVENTION

The present invention relates to a wallboard jack assembly and, more particularly, to a wallboard jack assembly for positioning material to a frame.

BACKGROUND

Commonly on building sites wallboard placement requires multiple workers depending on the size of the wallboard. Furthermore, additional workers are required to fasten the wallboard once the wallboard is positioned in the desired area. A major problem with utilizing multiple workers to place one piece of wallboard is efficiency. The lack of efficiency can amount to delays in the overall building project.

It is desirable to provide a wallboard jack assembly that permits a single worker to position and secure the wallboard to the frame of a building.

As the foregoing illustrates, the invention provides a wallboard jack assembly.

SUMMARY

A wallboard jack assembly is provided and includes a pair of extension beams, a cross beam, a pair of support beams, a locking mechanism, a grab bar, a back plate, and a top plate. The pair of extension beams includes a plurality of adjustment notches. The cross beam is positioned between the pair of extension beams. The pair of support beams includes an extension passageway extending a length of each support beam of the pair of support beams. The locking mechanism extends through each support beam of the pair of support beams. The grab bar is positioned between each support beam of the pair of support beams. The back plate includes a plurality of slots. The top plate includes a bellow located in a central region of the top plate.

BRIEF DESCRIPTION OF DRAWINGS

In the following, the present invention is described in more detail with references to the drawings in which.

DETAILED DESCRIPTION OF THE EMBODIMENTS

Figure 1:
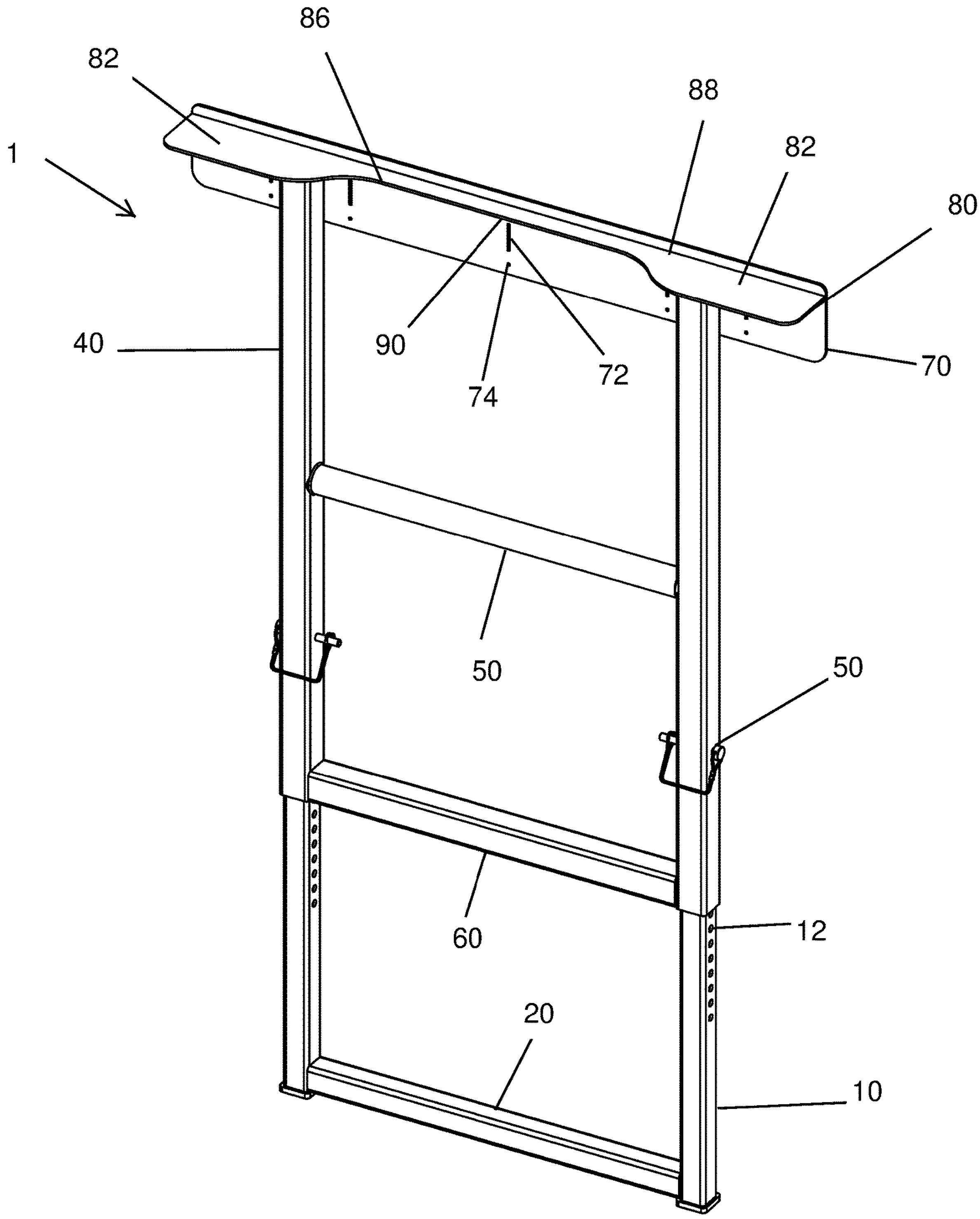
FIG. 1 is a front, top, left side view of the wallboard jack assembly.
Figure 2:
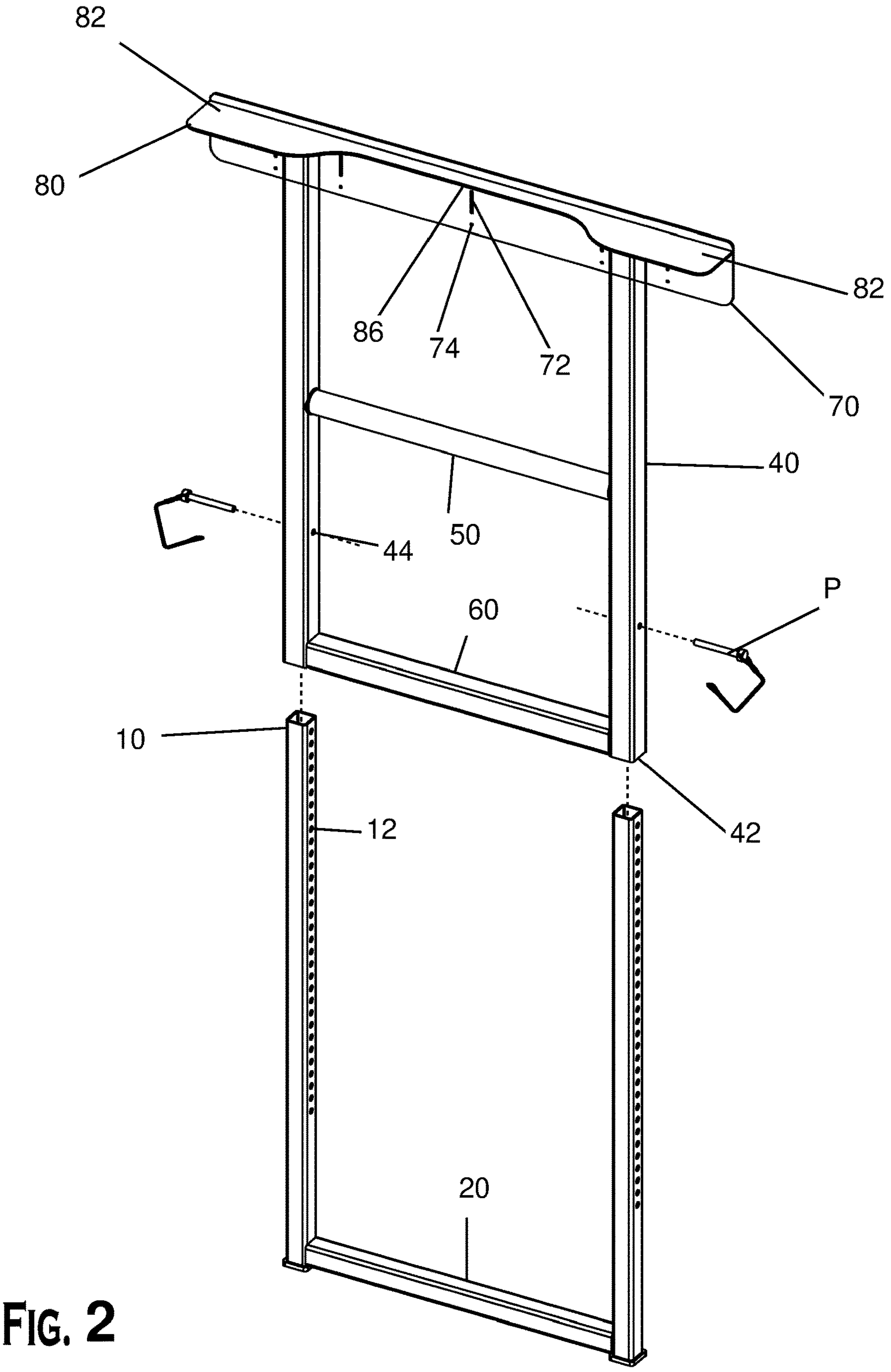
FIG. 2 is an exploded view of FIG. 1.
Figure 3:
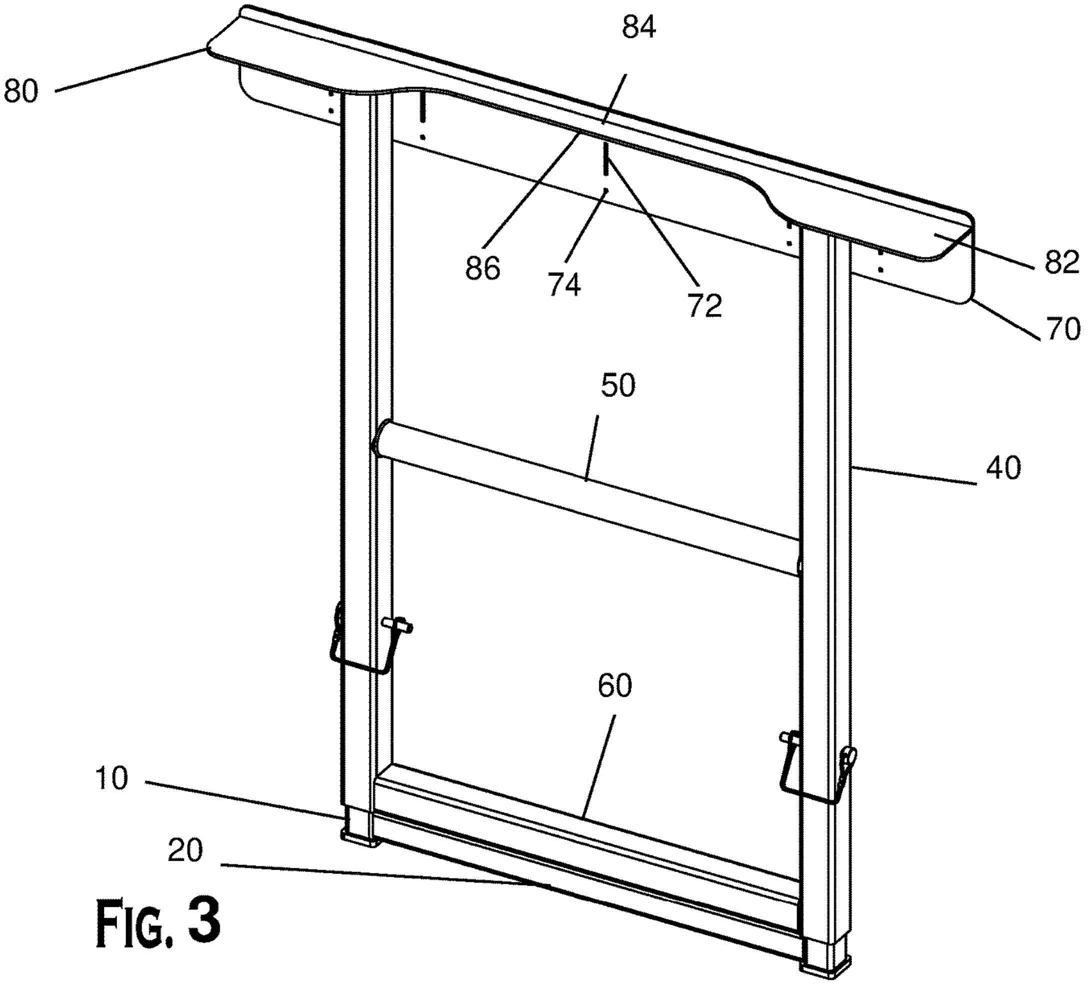
FIG. 3 is a front, top, left side view of FIG. 2.
Figure 4:
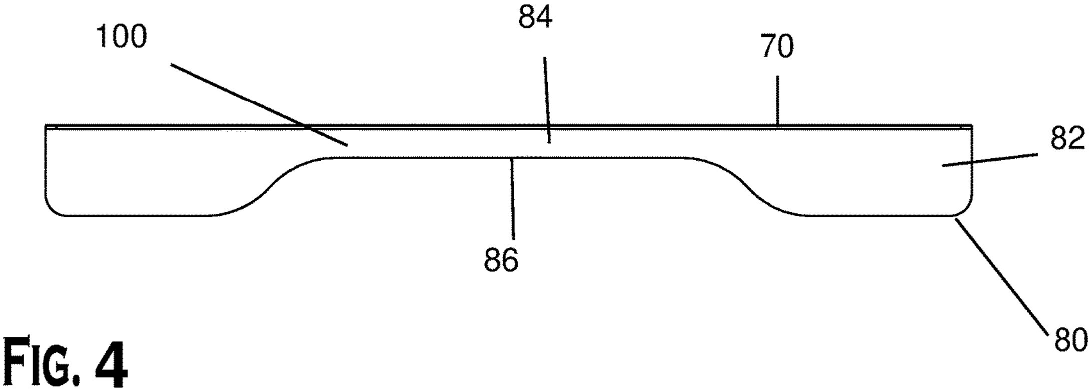
FIG. 4 is a top view of FIG. 3.
Figure 5:
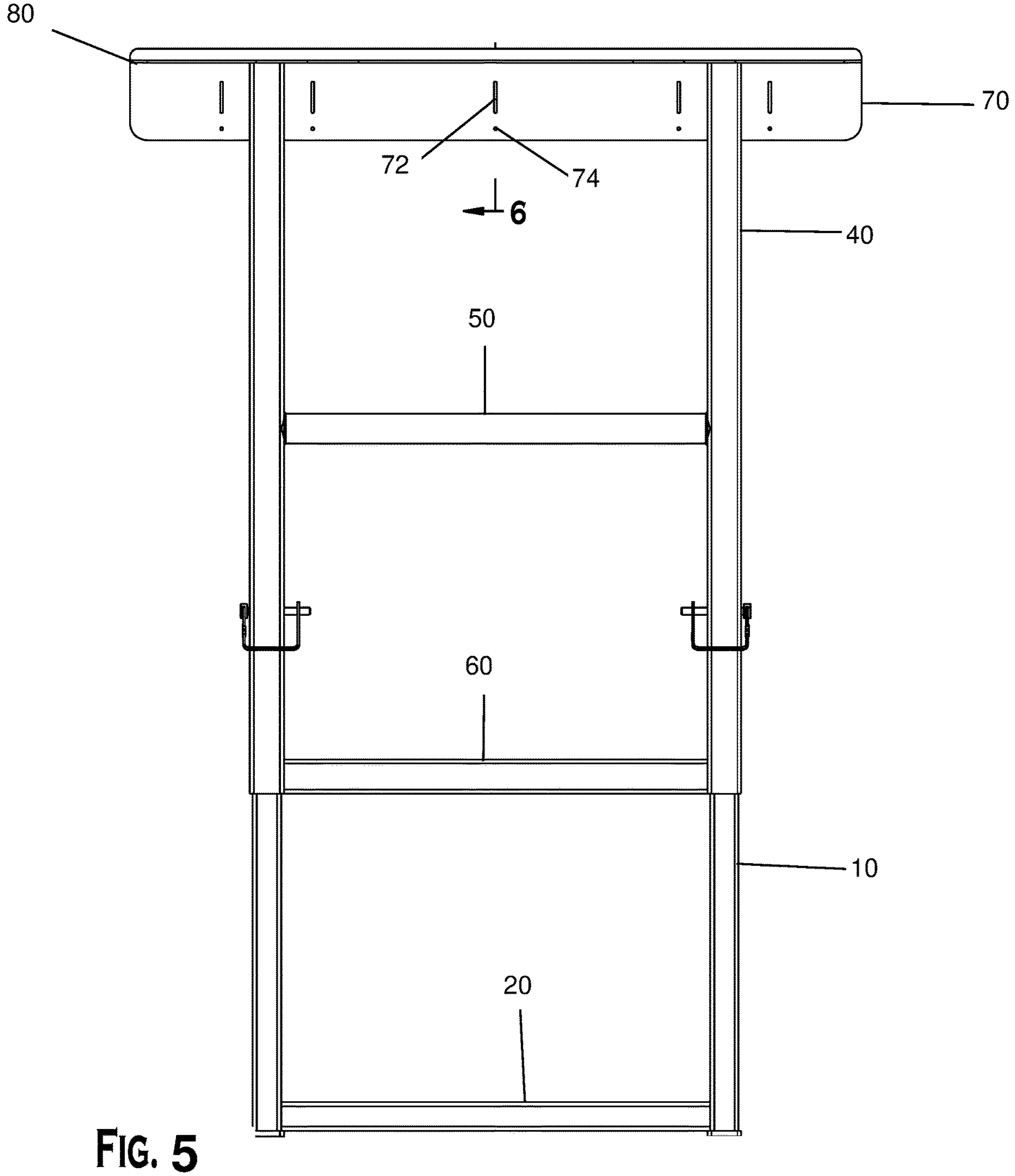
FIG. 5 is a front view of FIG. 4.
Figure 6:
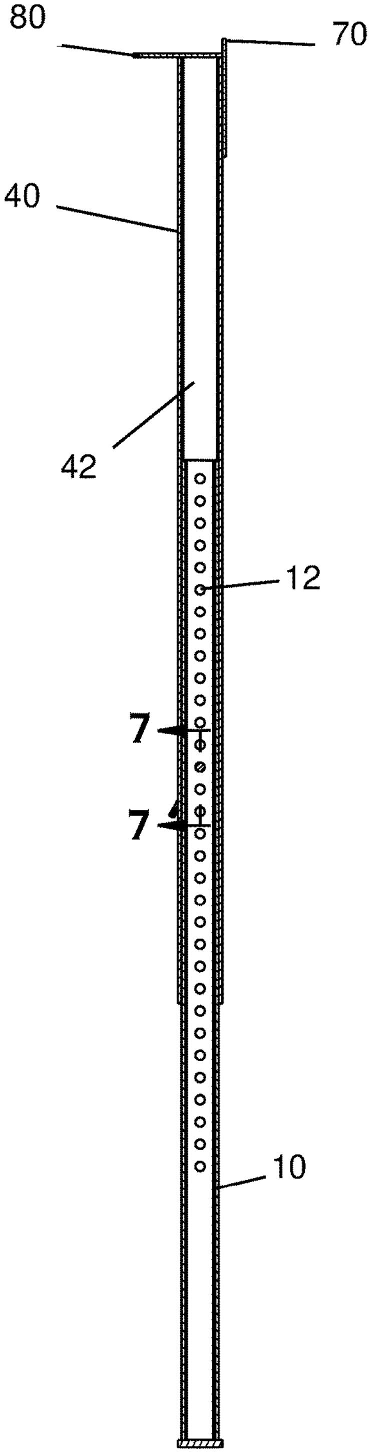
FIG. 6 is a left side view of FIG. 5.
Figure 7:
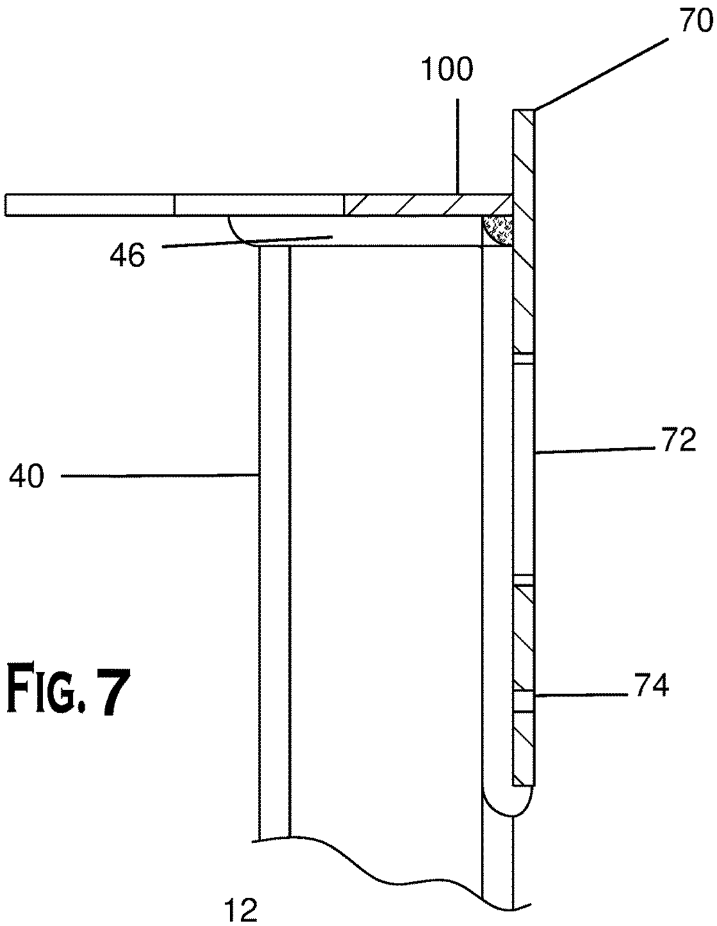
FIG. 7 is a cross section view of FIG. 6.
Figure 8:
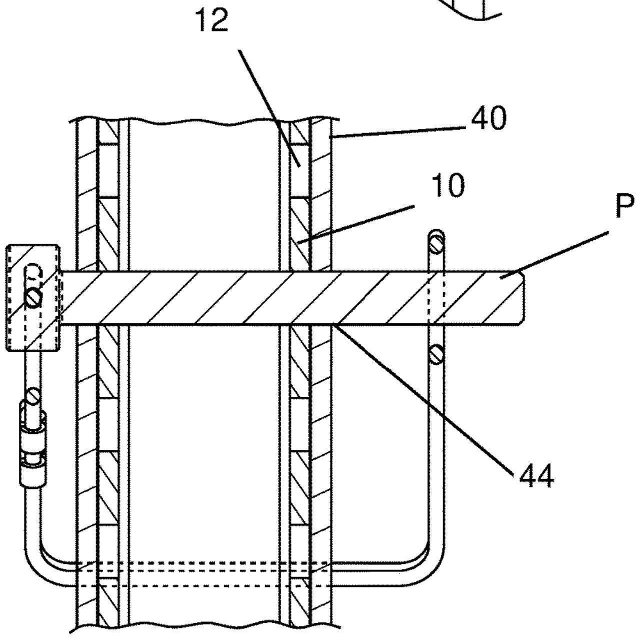
FIG. 8 is another cross section view of FIG. 7.
Figure 9:
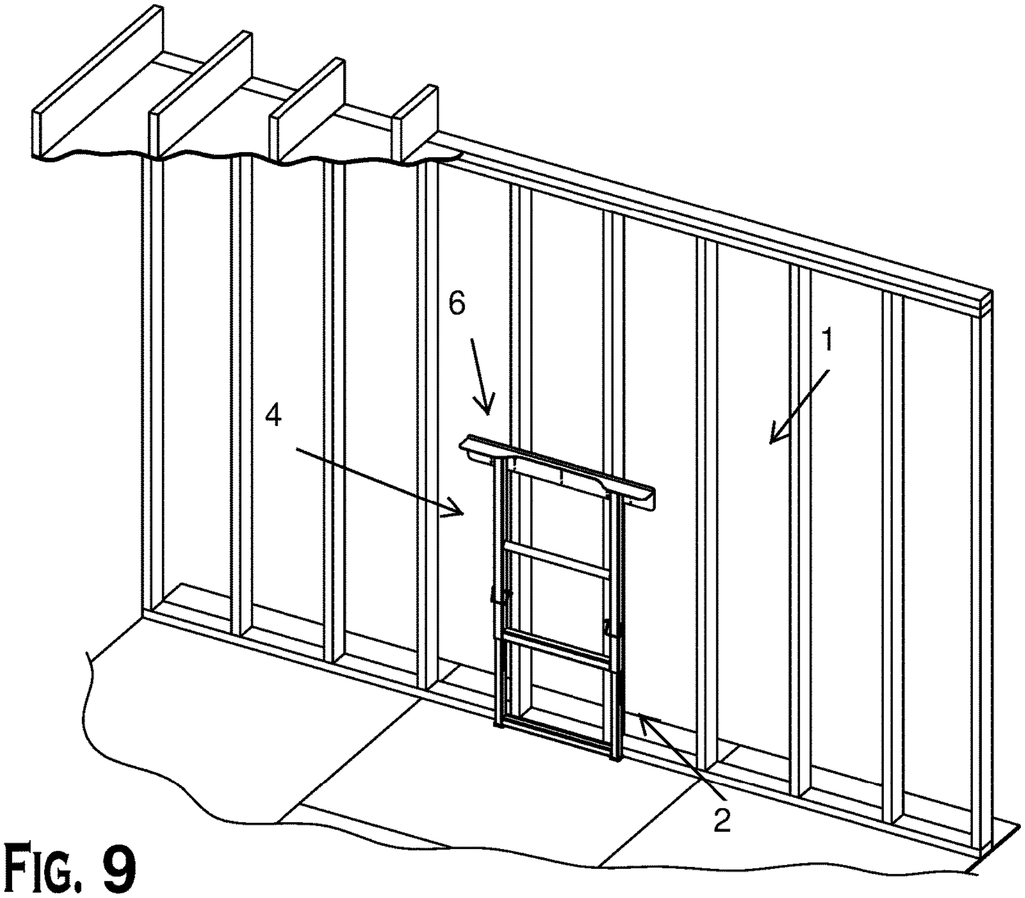
FIG. 9 is a front, top, left side view of FIG. 8.
Figure 10:
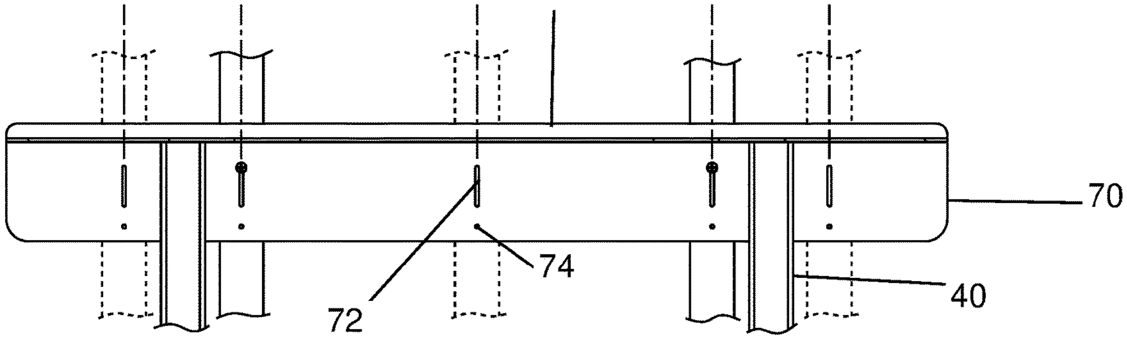
FIG. 10 is a front view of FIG. 9.
Figure 11:
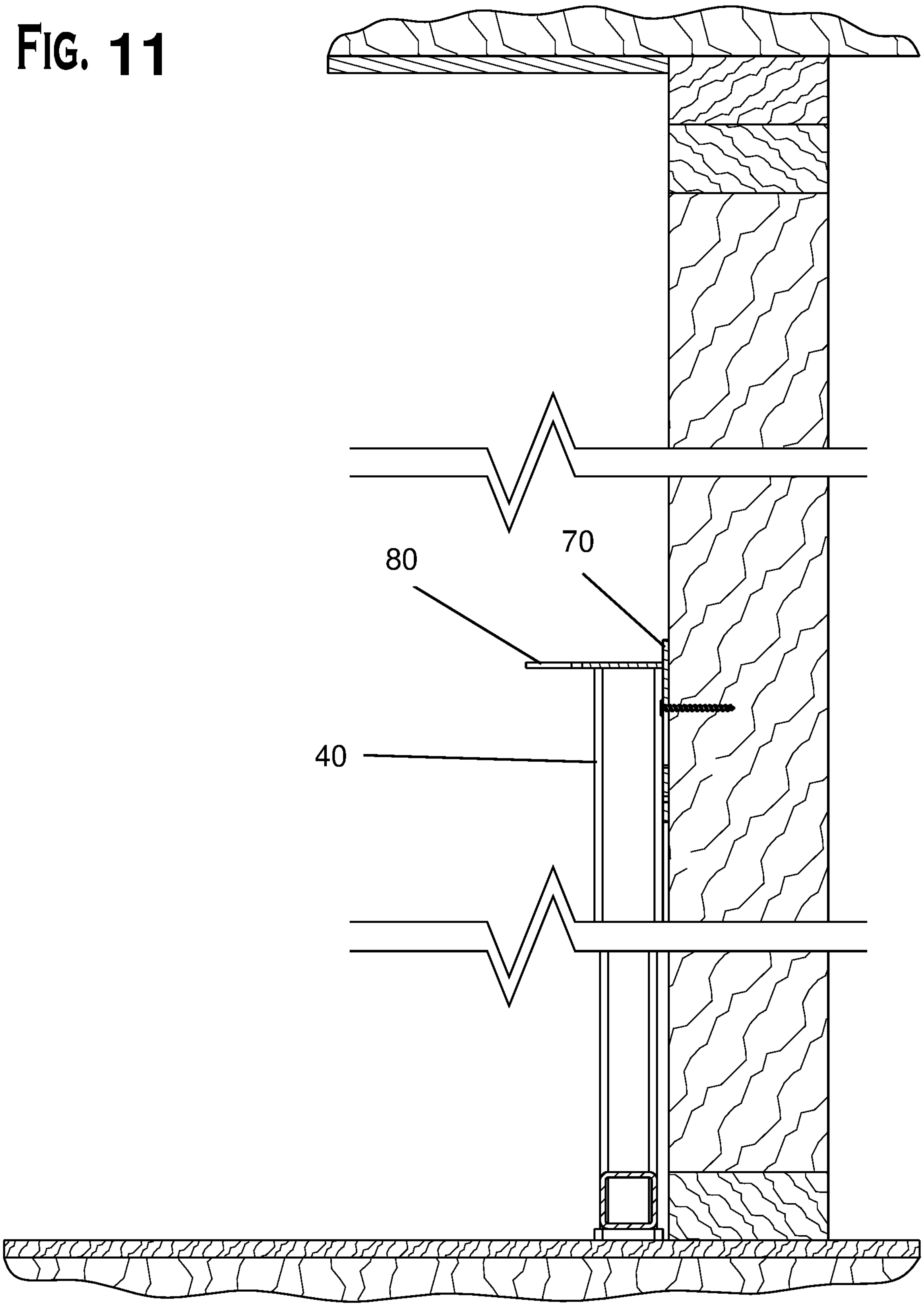
FIG. 11 is a cross section view of FIG. 10.
Figure 12:
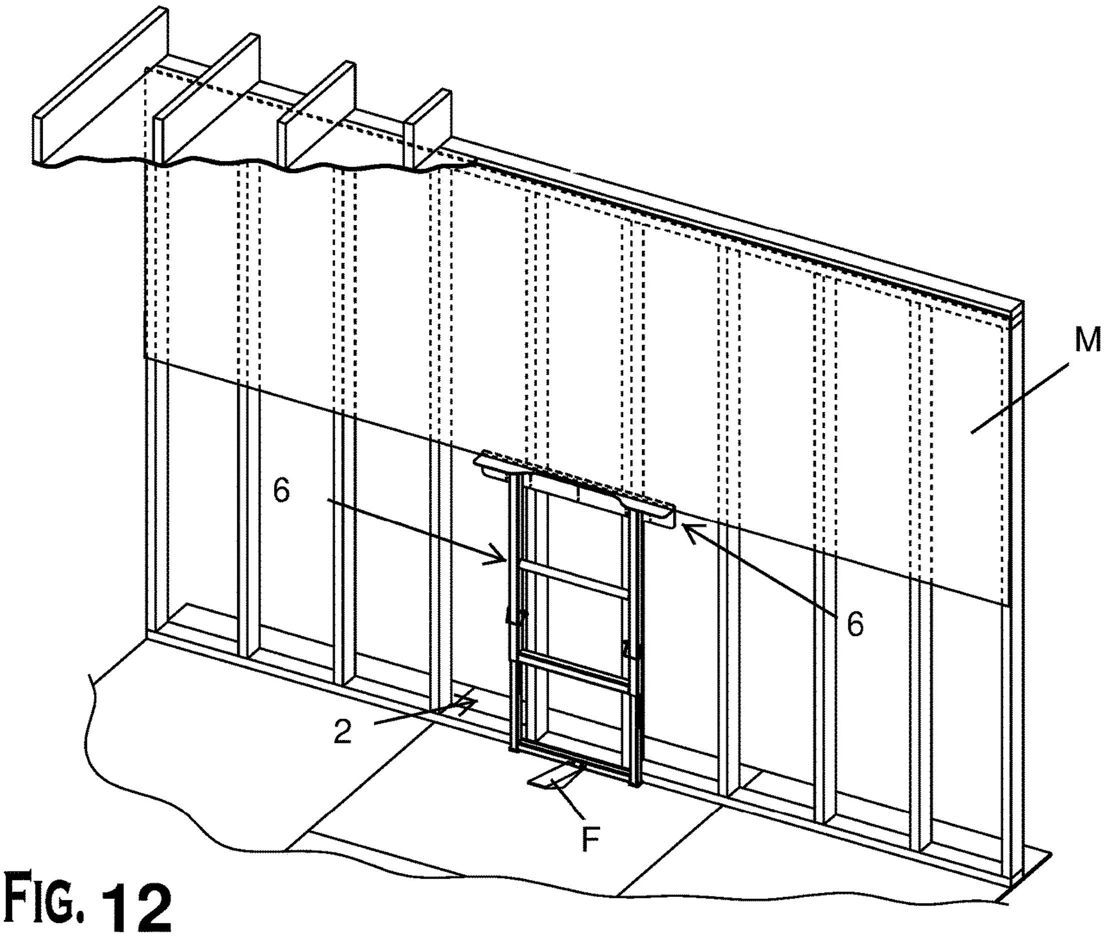
FIG. 12 is a front, top, left side view of FIG. 11.
Figure 13:
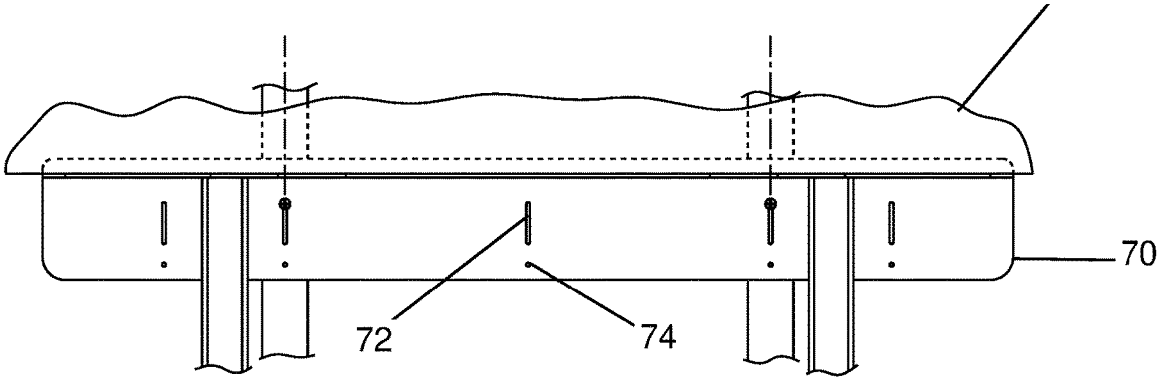
FIG. 13 is a front view of FIG. 12.
Figure 14:
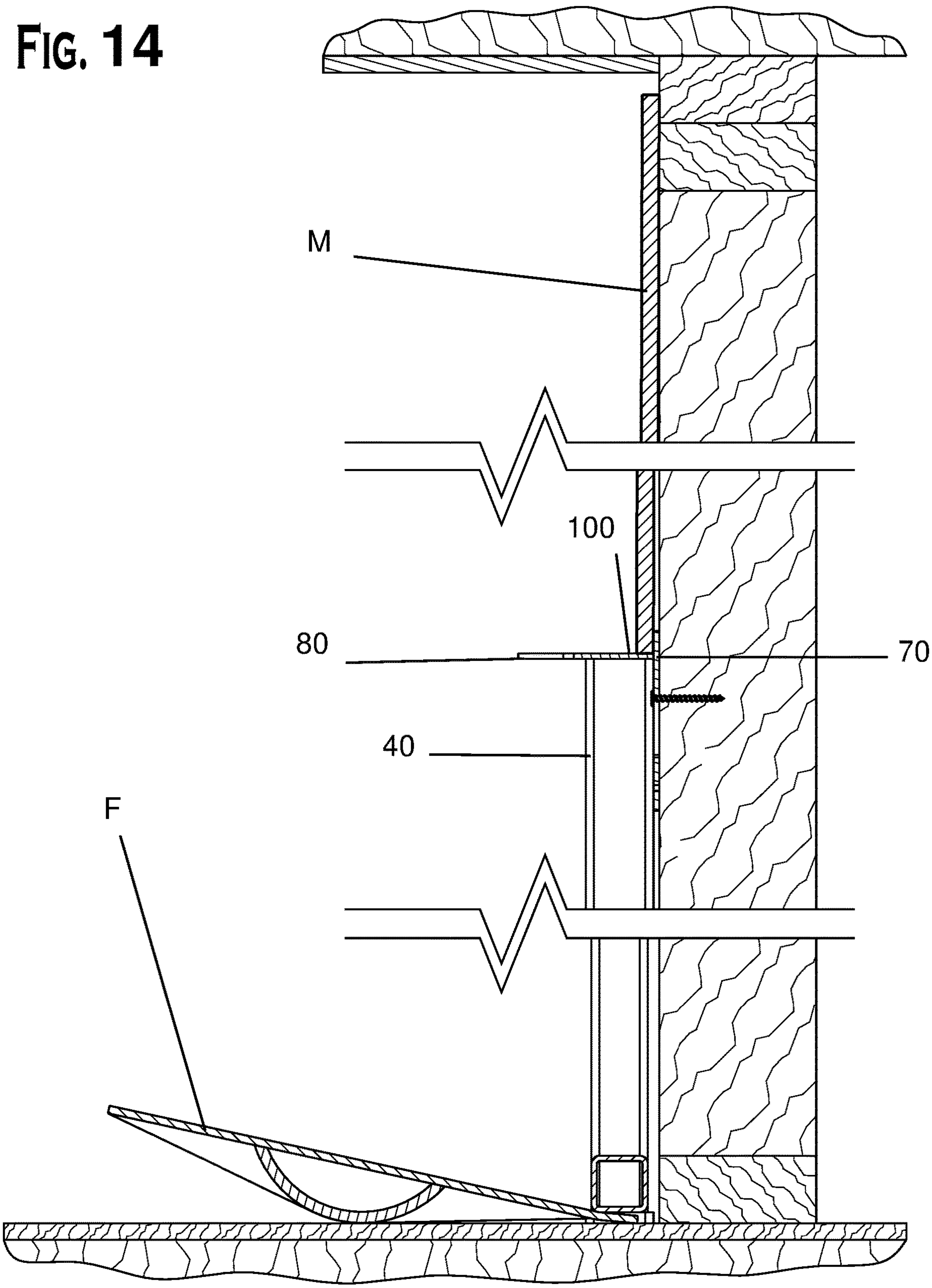
FIG. 14 is a cross section view of FIG. 13.
Figure 15:
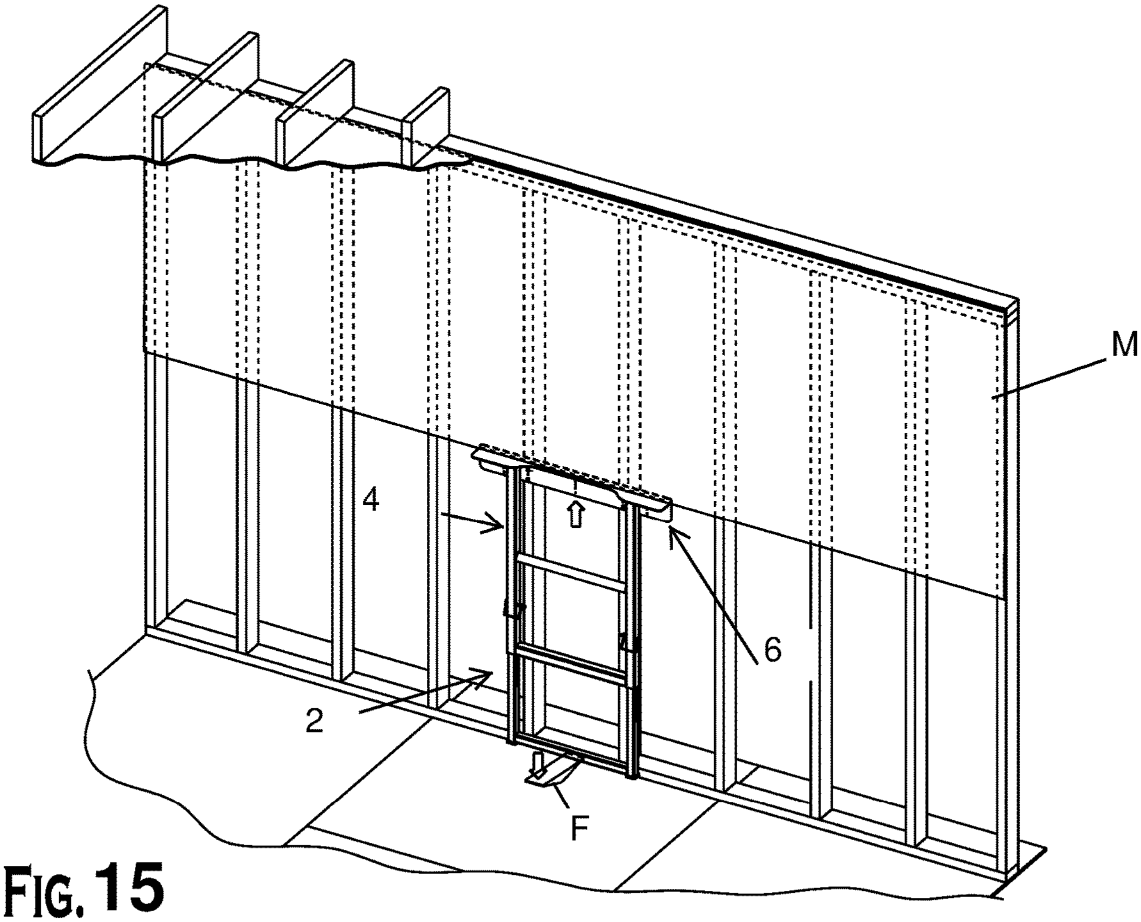
FIG. 15 is a front, top, left side view of FIG. 14.
Figure 16:
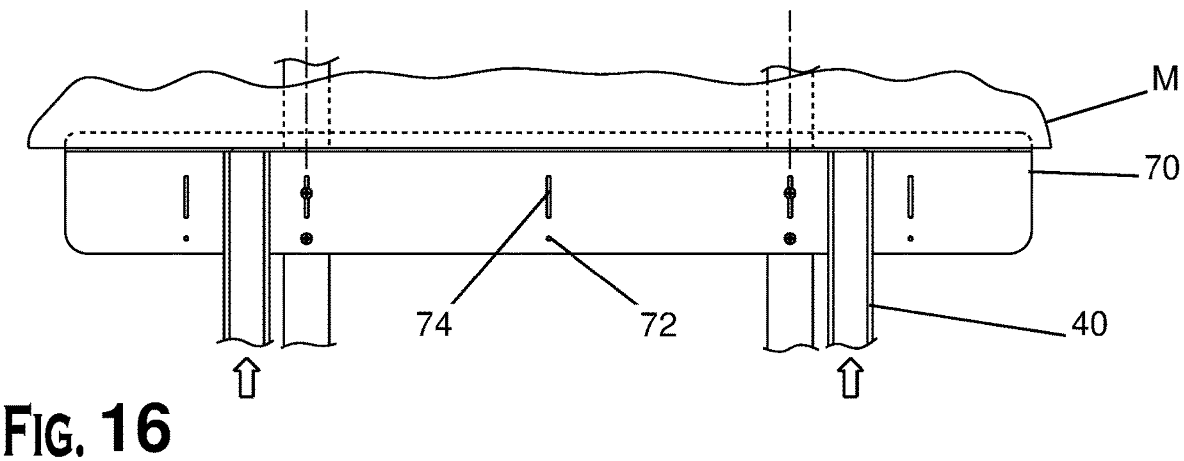
FIG. 16 is a front view of FIG. 15.
Figure 17:
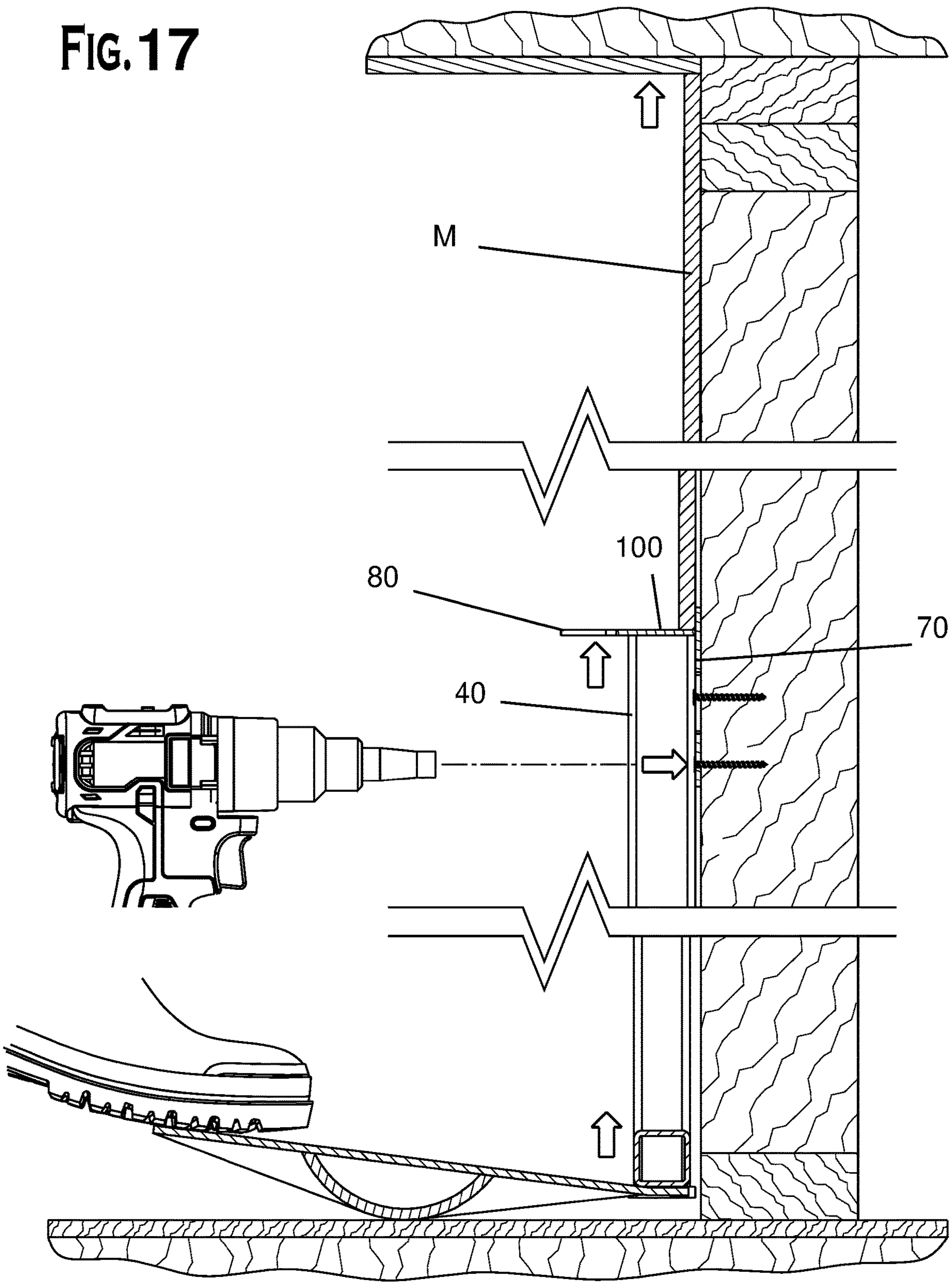
FIG. 17 is a cross section view of FIG. 16.
Figure 18:
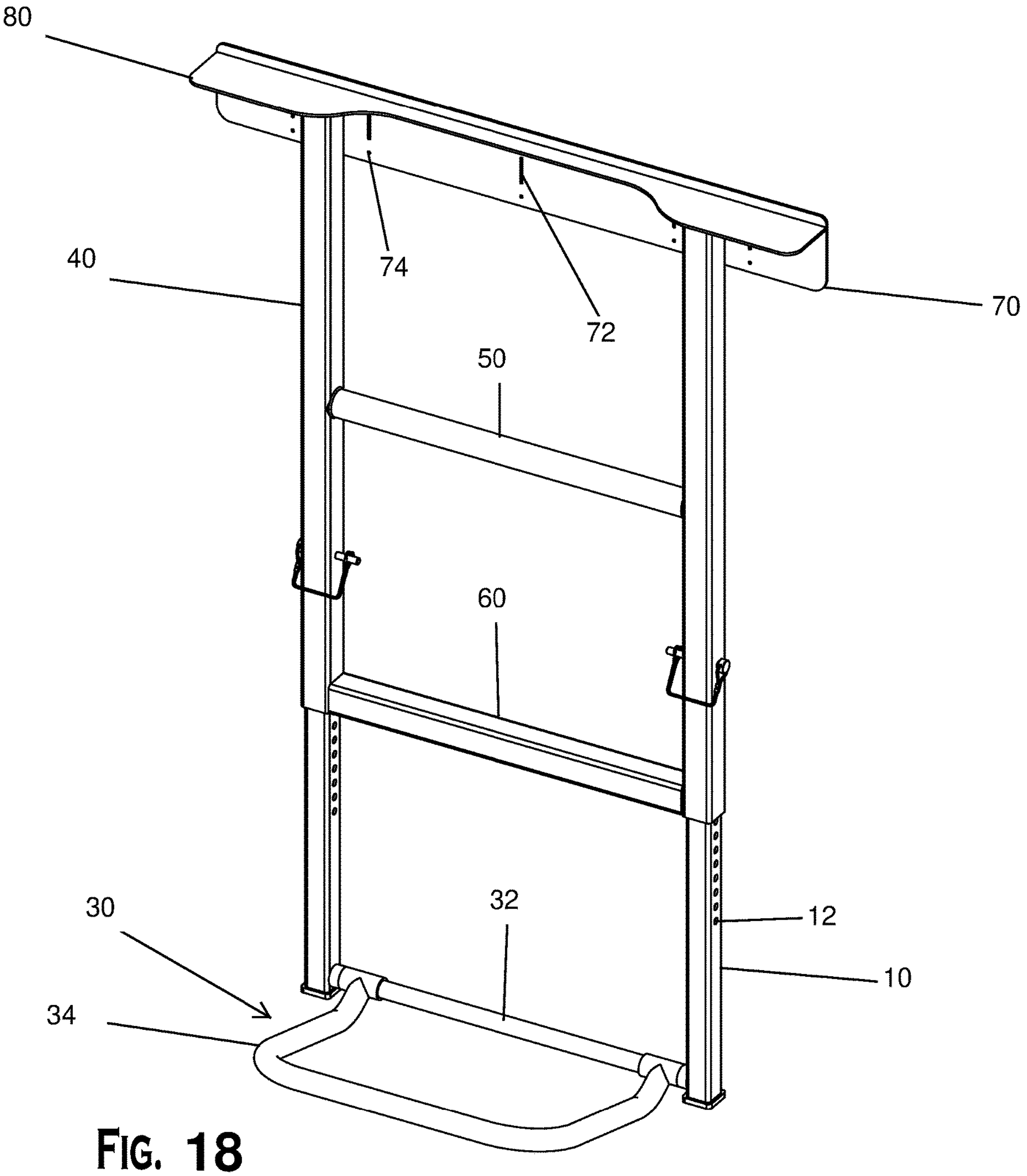
FIG. 18 is a front, top, left side view of FIG. 17.
Figure 19:
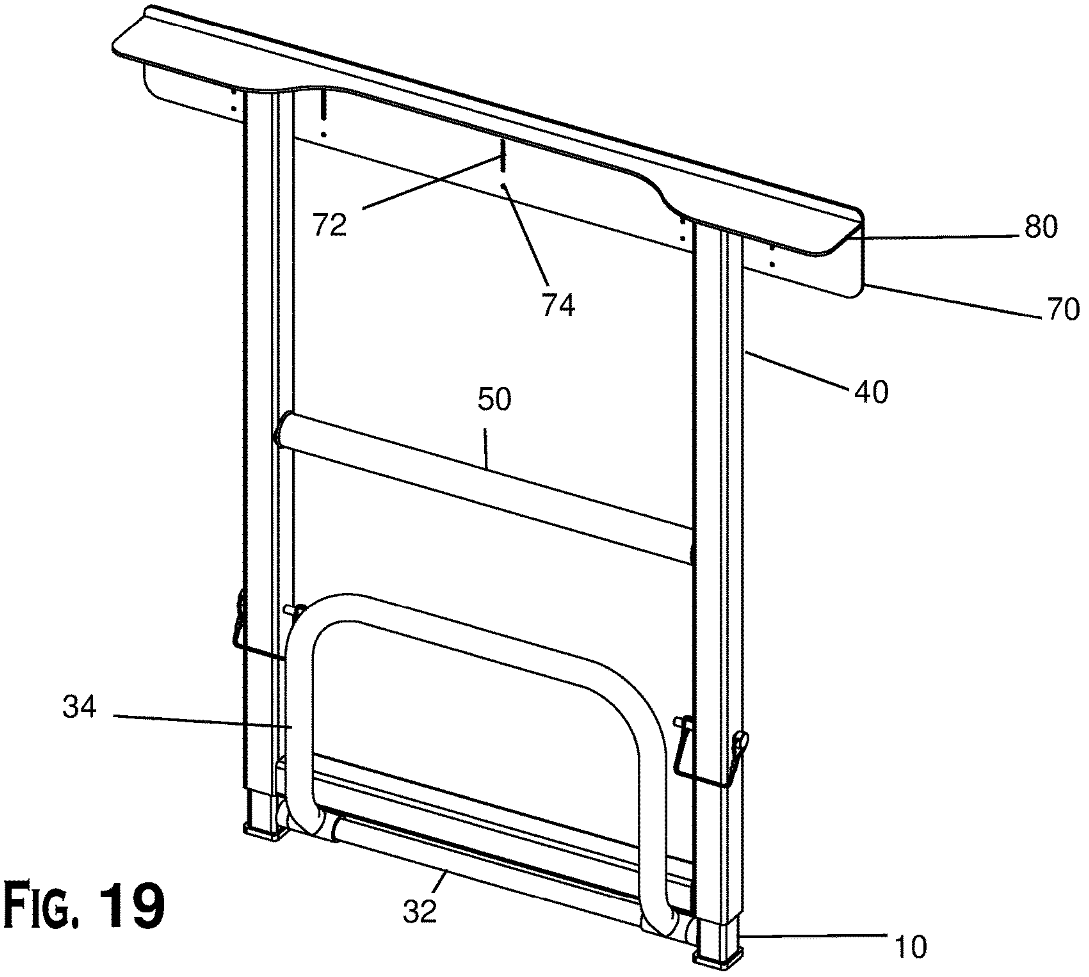
FIG. 19 is a front, top, left side view of FIG. 18.
Figure 20:
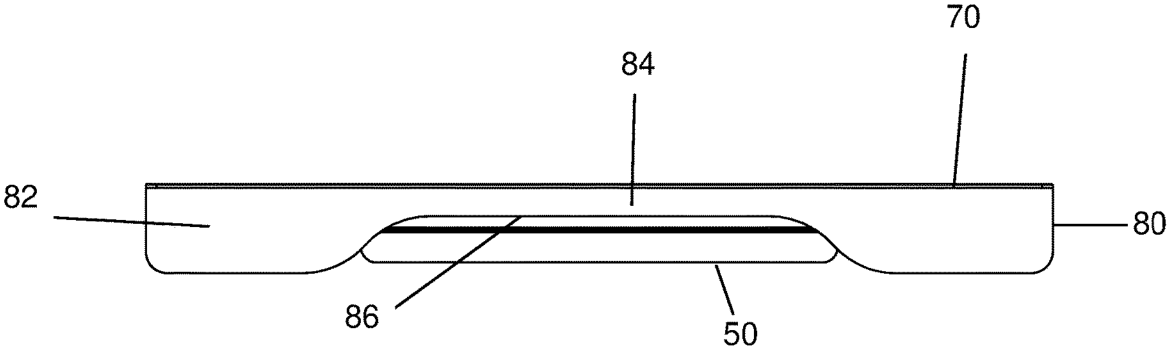
FIG. 20 is a top view of FIG. 19.
Figure 21:
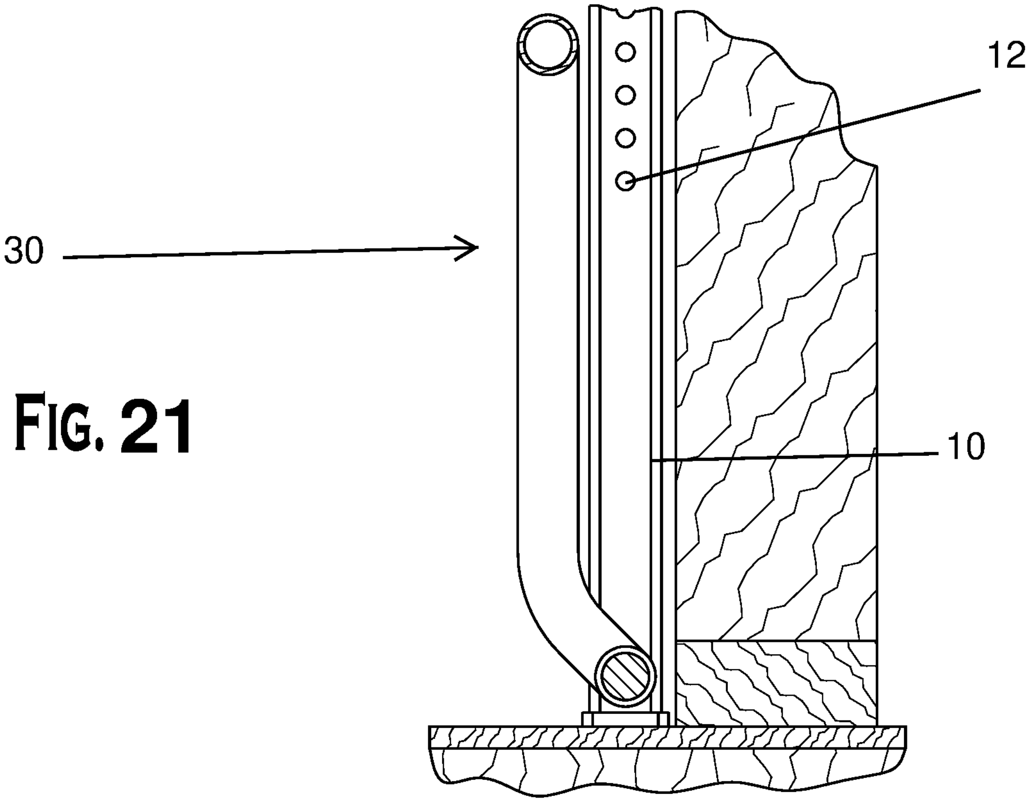
FIG. 21 is a cross section of FIG. 20.
Figure 22:
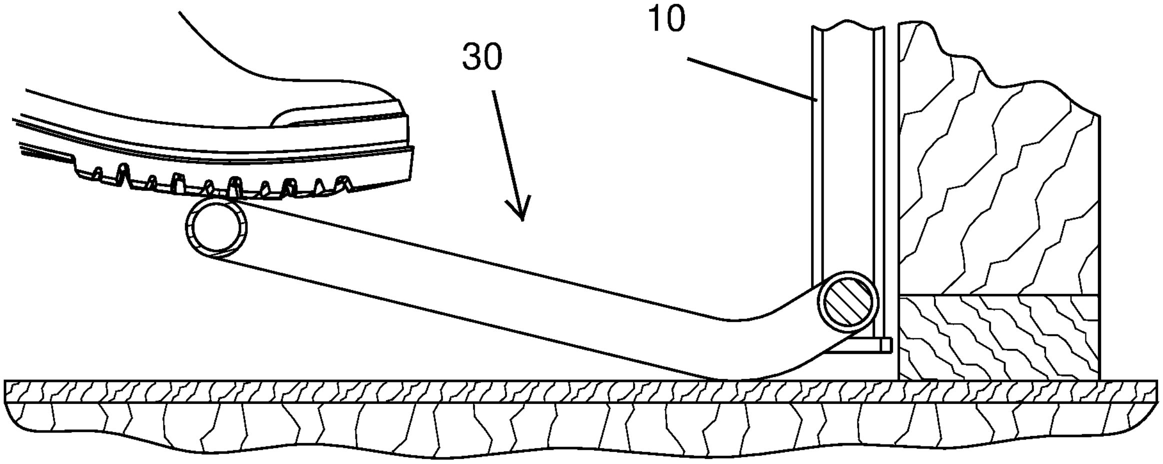
FIG. 22 is a cross section of FIG. 21.

The present disclosure includes a wallboard jack assembly 1 according to the invention. In the exemplary embodiment, the wallboard jack assembly 1 includes an extension assembly 2, a support assembly 4 and a shelf assembly 6.

As illustrated, the extension assembly 2 generally includes a pair of extension beams 10. Each extension beam 10 is a hollow elongated member. Each extension beam 10 further includes a plurality of adjustment notches 12. Each adjustment notch 12 is a passageway extending through each extension beam 10.

The extension assembly 2 further includes a cross beam 20. The cross beam 20 is a hollow elongated member. The cross beam 20 is positioned between each extension beam 10 on an inner edge of the extension beam 10. The cross beam 20 and the extension beam 10 form about a 90 degree angle when joined together.

In another embodiment, the cross beam 20 is replaced with a lever 30. The lever 30 generally includes a cylindrical beam 32 positioned between each of the extension beams 10. The lever 30 further includes a lift mechanism 34. The lift mechanism 34 is a u-shaped beam coupled at both ends to the cylindrical beam 32.

As illustrated, the support assembly 4 generally includes a pair of support beams 40. Each support beam 40 is a hollow elongated member. Each support beam 40 has a circumference larger than a circumference of each of the extension beams 10. Each support beam 40 further includes an extension passageway 42 extending a length of each support beam 40. Each support beam 40 further includes a locking mechanism 44. The locking mechanism 44 is a passageway extending through each support beam 40. Each support beam 40 further includes an upper portion 46.

The support assembly 4 further includes a grab bar 50. The grab bar 50 is a cylindrical member positioned between each support beam 40. One skilled in the art would understand the applicant's design is not the exclusive embodiment.

The support assembly 4 further includes a cross beam 60. The cross beam 60 is a hollow elongated member. The cross beam 60 is positioned between each support beam 40. Specifically, on an inner edge of each support beam 40 and below the grab bar 50. One skilled in art would understand the applicant's design is not the exclusive embodiment.

The shelf assembly 6 generally includes a back plate 70 and a top plate 80. One skilled in the art would understand the applicant's design is not the exclusive embodiment.

The back plate 70 is an elongated sheet. The back plate 70 further includes a plurality of slots 72. A first slot 72 is positioned on center. Additionally, a second slot 72 and a third slot 72 are positioned at 16" on center. A fourth slot 72 and a fifth slot 72 are positioned at 24" on center. One skilled in the art would understand the applicant's design is not the exclusive embodiment.

The back plate 70 further includes a plurality of rivet passageways 74 positioned below each of the slots 72. One skilled in the art would understand the applicant's design is not the exclusive embodiment.

The top plate 80 is an elongated u-shaped sheet. A pair of ends 82 of the of top plate 80 are wider than a central region 84 of the top plate 80. The top plate 80 further includes a bellow 86 located in the central region 84 of the top plate 80. Additionally, the top plate 80 further includes a top face 88 and a bottom face 90.

As assembled, the cross beam 60 is positioned horizontal on a level floor. The pair of extension beams 10 are positioned at each side of the cross beam 20. The pair of extension beams 10 are welded to the cross beam 20. One skilled in the art would understand other practices could be used to join the beams.

In another embodiment, the lever 30 is positioned between the extension beams 10. The cylindrical beam 32 of the lever 30 are coupled to the extension beams 10. One skilled in the art would understand the applicant's design is not the exclusive embodiment.

The cross beam 60 of the support assembly 4 is horizontally positioned between the pair of support beams 40. The pair of support beams 40 are welded to the cross beam 60. One skilled in the art would understand other practices could be used to join the beams. The grab bar 50 is positioned between each of the support beams 40. The grab bar 50 is welded to the support beams 40.

The upper portion 46 of each of the support beams 40 is welded to the back plate 70. The top plate 80 is positioned on each support beam 40 and joined together. The top plate 80 is positioned and joined to the back plate 70 forming a ledge 100. Specifically, about a 90 degree ledge 100. One skilled in the art would understand there are multiple ways for the top plate 80 and the back plate 70 to be joined together.

The operator will transfer the wallboard jack assembly 1 to a desired location by holding the grab bar 50 and positioning their shoulder against the bellow 86. The operator can lower the overall height of the wallboard jack assembly 1 by lowering each support beam 40 towards a lowest adjustment notch 12. Once the operator chooses the correct height, the operator inserts a pin or fastener P through the locking mechanism 44 of the support beam 40 and the adjustment notch 12 of the extension beam 10.

Similarly, the operator can raise the overall height of the wallboard jack assembly 1 by raising each support beam 40 towards a highest adjustment notch 12. Once the operator chooses the correct height, the operator inserts the pin or fastener P through the locking mechanism 44 of the support beam 40 and the adjustment notch 12 of the extension beam 10.

In circumstances where additional height is needed, a properly placed fulcrum F is placed under the cross beam 20 of the extension assembly 2 to extend the height of the wallboard jack assembly 1 even further. The operator applies a downwards pressure to the fulcrum F in order to extend the height of the wallboard jack assembly 1 in an upwards direction.

In another embodiment, the lever 30 is rotated outwards and away from the wallboard jack assembly 1. The operator applies a downwards pressure to the lever 30. The lift mechanism 34 is forced into the ground because of the downwards pressure that is applied. Consequently, the wallboard jack assembly 1 is then lifted in an upwards direction.

The operator then inserts a plurality of fasteners through either the plurality of slots 72 or the plurality of rivet passageways 74 to secure the wallboard jack assembly 1 to the desired location. A material M is then place on the ledge 100 and fasteners are threaded through the material M to secure the material M to the desired frame.

It should be noted that various changes and modifications to the embodiments described herein will be apparent to those skilled in the art. Such changes and modifications may be made without departing from the spirit and scope of the present invention and without diminishing its intended advantages. For example, various embodiments of the systems and methods may be provided based on various combinations of the features and functions from the subject matter provided herein.

What is claimed is:

1. A wallboard jack assembly comprising:

a pair of extension beams with a plurality of adjustment notches, each adjustment notch of the plurality of adjustment notches are passageways extending through each extension beam;

a cross beam of the pair of extension beams, positioned between each extension beam on an inner edge of each extension beam of the pair of extension beams;

a pair of support beams with an extension passageway extending a length of each support beam of the pair of support beams, a cross beam of a support assembly is positioned between each support beam;

a locking mechanism extending through each support beam of the pair of support beams;

a grab bar positioned between each support beam of the pair of support beams, the cross beam of the support assembly is positioned on an inner edge of each support beam and below the grab bar;

a back plate with a plurality of slots, a first slot of the plurality of slots is positioned in a central region of the back plate, a second slot and a third slot of the plurality of slots are positioned adjacent the first slot at opposing ends, a fourth slot and a fifth slot of the plurality of slots are positioned adjacent the second slot and the third slot at opposing ends, a plurality of rivet passageways are positioned between each slot of the plurality of slots; and a top plate with a pair of tapering downward angles positioned at opposing ends and extending towards a central region of the top plate, the pair of tapering downward angles are positioned between a pair of ends of the pair of support beams, each end of the support beams couples to the top plate.

2. The wallboard jack assembly of claim 1, wherein the cross beam of the pair of extension beams and each extension beam form about a 90 degree angle.

3. The wallboard jack assembly of claim 2, wherein each support beam has a circumference larger than a circumference of each extension beam of the pair of extension beams.

4. The wallboard jack assembly of claim 3, wherein the second and third slot of the plurality of slots are positioned at about 16" on center from the first slot.

5. The wallboard jack assembly of claim 4, wherein the fourth and fifth slot of the plurality of slots are positioned at about 24" on center from the first slot.

6. The wallboard jack assembly of claim 4, wherein a pair of ends of the top plate are wider than the central region of the top plate.

7. The wallboard jack assembly of claim 6, wherein an upper portion of each support beam is joined to the back plate.

8. The wallboard jack assembly of claim 7, wherein the top plate is positioned on each support beam of the pair of support beams and joined together.

9. The wallboard jack assembly of claim 8, wherein the top plate is positioned and joined to the back plate forming about a 90 degree ledge.

10. The wallboard jack assembly of claim 9, wherein the wallboard jack assembly is lowered in height by lowering each support beam towards a lowest adjustment notch of the plurality of adjustment notches.

11. The wallboard jack assembly of claim 10, wherein the wallboard jack assembly is raised in height by raising each support beam towards a highest adjustment notch of the plurality of adjustment notches.

12. The wallboard jack assembly of claim 11, wherein the wallboard jack assembly further comprises a lever.

13. The wallboard jack assembly of claim 12, wherein a downwards pressure is applied to the lever while the wallboard jack assembly is lifted in an upwards direction.

14. The wallboard jack assembly of claim 1, wherein a lever is coupled between the pair of extension beams and rotates outward and away from the pair of extension beams.

15. The wallboard jack assembly of claim 1, wherein the pair of support beams are positioned against the back plate.

16. The wallboard jack assembly of claim 15, wherein, the back plate extending above and below a horizontal plane of the top plate, the plurality of slots and plurality of rivet passageways are positioned below the top plate.

* * * * *